No. 893,255. PATENTED JULY 14, 1908.
A. S. LISS.
ENGINE MALLET.
APPLICATION FILED APR. 7, 1906.
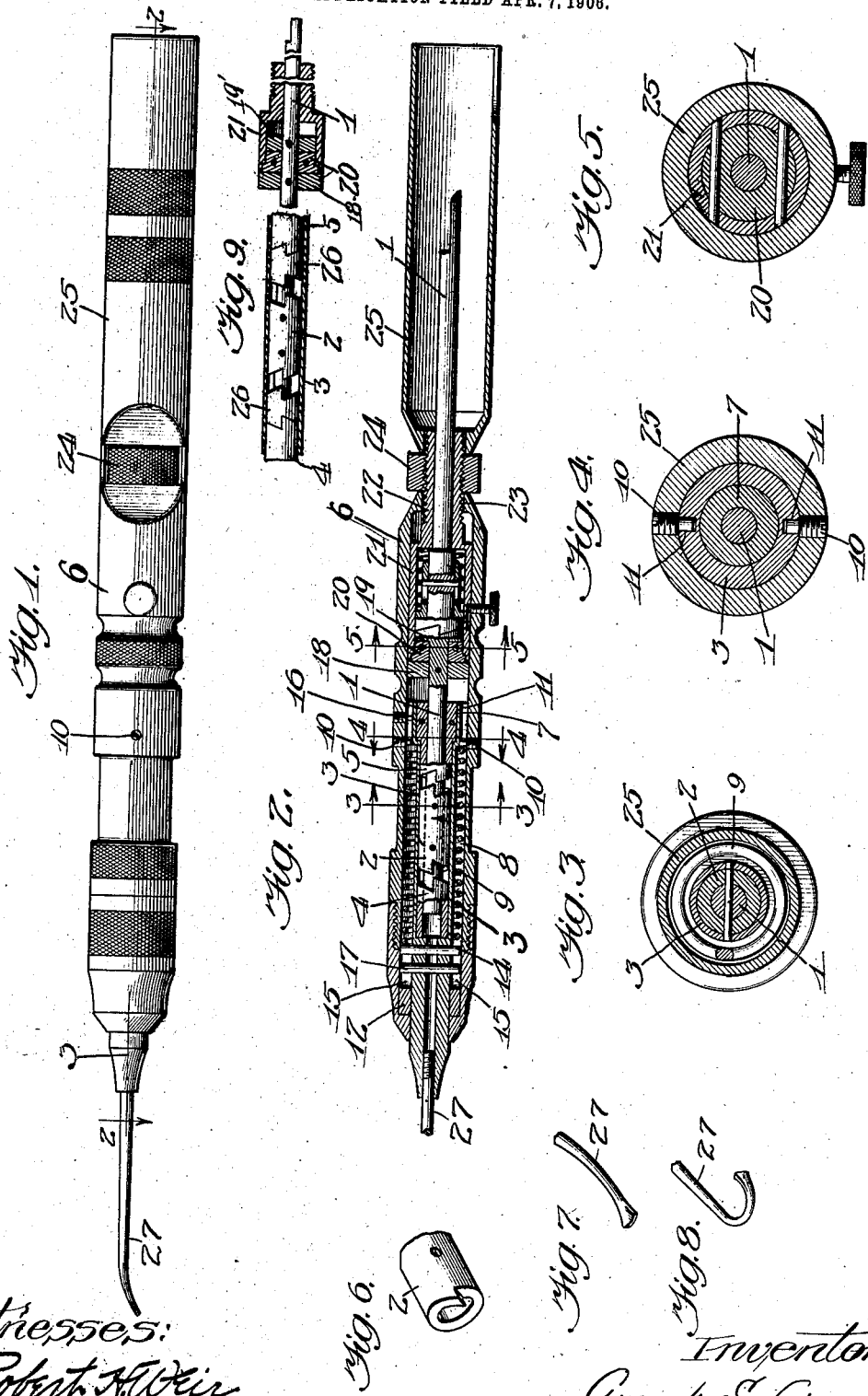
Witnesses:
Robert H. Weir
L. C. Domarus
Inventor
August S. Liss
By Hill & Hill
Attys.

UNITED STATES PATENT OFFICE.

AUGUST S. LISS, OF CHICAGO, ILLINOIS.

ENGINE-MALLET.

No. 893,255.     Specification of Letters Patent.     Patented July 14, 1908.

Application filed April 7, 1906. Serial No. 310,421.

*To all whom it may concern:*

Be it known that I, AUGUST S. LISS, a citizen of the United States, residing at Chicago, county of Cook, and State of Illinois, have invented certain new and useful Improvements in Engine-Mallets, of which the following is a description.

My invention relates to dental instruments and especially to that class of dental instruments adapted to be operated with a dental engine, and known as a mallet or plugger, which are employed for packing filling into a tooth cavity.

The object of my invention is to produce a device of the kind described, simple, convenient, compact and durable, in which if desired either a direct outward stroke, or a back action or drawing stroke, may be secured at the will of the operator, who is also enabled to accurately gage the force of the stroke in either direction to suit his requirements.

To this end my invention consists in the novel construction, arrangement, and combination of parts herein shown and described, and more particularly pointed out in the claims.

In the accompanying drawings wherein like or similar reference characters indicate like or corresponding parts; Figure 1 is an elevation of my device. Fig. 2 is a section taken substantially on line 2—2 of Fig. 1. Fig. 3 is an enlarged section taken substantially on line 3—3 of Fig. 2. Fig. 4 is an enlarged section taken substantially on line 4—4 of Fig. 2. Fig. 5 is an enlarged section taken substantially on line 5—5 of Fig. 2. Fig. 6 is an enlarged fragmentary detail in perspective. Fig. 7 is an enlarged plugger point adapted for use in my device when a direct or outward stroke is to be employed. Fig. 8 is an enlarged plugger point adapted for use in my device when a back action or drawing stroke is to be employed. Fig. 9 is a modified form of operating mechanism for use in my device.

In the preferred form of my device shown in the drawings, a shaft 1 is provided adapted to be engaged by a hand piece of a dental engine or other suitable motor for rotating the same at any desired speed, a cylindrical cam 2 is rigidly mounted upon the shaft 1 with any desired number of teeth or cam faces at each end thus providing substantially two independent cams with preferably free drops from the crest of one tooth to the root of the next succeeding tooth or where a single tooth is provided having the part connecting the crest with the root of the tooth substantially parallel with the axis of the cam. A tubular sleeve is provided which incloses the cam 2 and has rigidly secured therein, on opposite sides of said cam, parts 4 and 5, which parts are provided with openings axially therewith through which the shaft 1 passes and in which said shaft is free to rotate. The inner faces of the parts 4 and 5 are each preferably duplicates of the faces of the cams 2 with which they coöperate but such parts may be provided with any means for engaging the teeth or faces of the cam 2. The distance between the adjacent portions of the parts 4 and 5 is slightly greater than the extreme length of the cam 2 so that when the parts are in the position shown in the drawings the shaft 1 may be rotated without the cam 2 engaging at either end. If however the shaft 1 and cam 2 are moved longitudinally in the sleeve 3 towards either the part 4 or 5 and then rotate in the direction indicated by the arrow in Fig. 2 of the drawings it is obvious that the cam teeth will periodically engage with the part 4 or 5 towards which the cam 2 was moved and tend to move the sleeve 3 longitudinally substantially the same distance the cam 2 is moved and suddenly releases the same permitting it to be returned to its normal position.

Any suitable means may be provided to resiliently maintain the sleeve 3 in the position indicated. In the form shown a shell or handle 6 is provided inclosing the mechanism of my device and adapted also to serve as a handle for manipulating the instrument when in operation. The shell 6 constitutes a support for the sleeve 3 which is slidably mounted for longitudinal movement therein. As shown the sleeve 3 is cylindrical and practically of a uniform diameter, considerably less than the internal diameter of the shell 6, to a point near the inner end 7 of the sleeve where it is increased sufficiently to snugly fit the shell, and the forward end of the handle has secured thereto in any suitable manner an extension, the forward end of which is reduced so as to embrace and support the forward end of said sleeve, which projects therethrough. A spring 9 is positioned in the space 8 with one end pressed against the part 7 and one or more screws, pins or equivalent means 10—10 which are rigidly fixed in the wall of the handle and project into slots or grooves 11 in the part 7 and thereby prevent rotation between the sleeve 3 and handle 6 but permit the sleeve 3 to move longitudinally in said handle. The opposite end of the spring 9 is arranged to normally press against a bushing 12 and also against a pin 14 or equivalent means upon the sleeve 3, suitable slots 15 being provided in the bushing 12 to hold said sleeve against rotation and to allow sufficient longitudinal movement between the sleeve and handle. It will be seen from the above that the spring 9 engages at each end fixed portions of both the sleeve 3 and the handle 6 when in their normal position, and it is evident that if the sleeve 3 is moved longitudinally of the handle 6 in either direction the spring 9 will tend to immediately restore it to its normal position. If now the shaft 1 and cam 2 are moved in either direction in the handle 6 and held from longitudinal movement therein and then rotated in the direction indicated by the arrow one end of the cam 2 will engage either the part 4 or 5 as the case may be, causing the sleeve 3 to be moved from its normal position by each tooth or cam face engaging the coöperating portion of the part 4 or 5 and permitting the spring 9 to restore the sleeve 3 to its normal position between such engagement with a snap or movement producing a sharp blow. A supplemental screw 16 and a pin 17 are provided to prevent rotation between the parts during the movements of the sleeve 3.

Any suitable means may be provided to adjust and hold the shaft 1 in its adjusted position. In the form shown collars 18 and 19, are fixedly mounted upon the shaft 1 on each side of a non-rotatable collar 20 which is rigidly attached to a part 21 provided with a threaded stem 22 extending through an opening 23 formed in the end of the handle 6 and provided with a suitable nut 24 to adjust the position of the shaft as above described. In the form shown a socket 25 is formed integral with the handle 6 and the nut 24 is positioned in a suitable opening between the handle 6 and socket 25 preventing longitudinal movement of the nut and leaving the same sufficiently exposed so that it may be conveniently operated. The shaft 1 is extended into the socket 25 and suitably formed for engagement by a suitable hand piece or equivalent means for rotating the shaft.

The end of the sleeve 3 may be formed in any suitable manner for engaging the plugger point 27 or other instrument. In the form shown a socket is provided in the end of the sleeve and suitably threaded or otherwise formed to suitably engage the shank of the plugger point in the usual or any preferred manner.

Obviously in the form shown in the drawings longitudinal portions of the teeth or lobes of the cam 2 may engage the projections upon the parts 4 and 5 as the case may be and lock the shaft against rotation in the handle. To avoid this difficulty in the form shown the shaft 1 is made in two sections with a simple form of spring actuated spiral clutch between the sections so that in case the hand piece is rotated in the wrong direction the two parts of the shaft 2 are temporarily disengaged and the device will not operate.

Where it is desired that the device should operate when the shaft is rotated in either direction the lobes or teeth upon the parts 4 and 5 and upon a cam 2 are all made to face in the same direction as shown in Fig. 9. And small supplemental double cams 26—26 are loosely mounted upon the shaft 1 at each end of the cam 2, suitably formed to rotate with the cam 2 when the shaft is turned in one direction and to remain stationary with the parts 4 or 5 when the shaft is rotated in the opposite direction each of said cams 26—26 thus attaching itself to and forming an extension upon either the cam 2 or the parts 4 and 5 depending upon the direction of the rotation of the shaft 1. Obviously my device can otherwise be similar in all respects to that shown in Fig. 2, except that the shaft 1 is preferably formed in a single piece as shown.

It will be observed that the blow or action of my device is exactly the same with the direct and with the back action stroke the only difference being the reversal of the movement, and that by adjusting the position of the nut 24 upon the stem 22 the force of the blow may be controlled to suit the various conditions as required.

In the foregoing specification only the preferred form of my improvement is described, and it is obvious that various immaterial modifications may be made in my device without departing from the spirit of my invention, hence I do not wish to be understood as limiting myself to the exact form or construction shown.

What I claim as new, and desire to secure by Letters Patent is:—

1. A device of the kind described, comprising a handle, a shaft rotatably mounted within said handle, and means for controlling the longitudinal position of said shaft, in combination with a tool carrying member slidably mounted in and resiliently maintained in a fixed position in said handle, intermediate mechanism operated by the rotation of said shaft and controlled by the longitudinal position of the shaft for successively moving said tool carrying member longitudinally of said handle in either direction and releasing the same.

2. A device of the kind described, comprising a handle and a shaft rotatably mounted in said handle, in combination with a tool carrying member mounted in, and resiliently maintained in a fixed position in said handle, a two faced cam and coöperating parts mounted respectively upon said shaft and said tool carrying member, adapted by the rotation of said shaft to move said tool carrying member longitudinally of said handle in either direction and release the same, the extent and direction of said movement being controlled by the longitudinal position of said shaft, and means for controlling the longitudinal position of said shaft.

3. A device of the character described, comprising a handle, a shaft rotatably mounted therein, two substantially independent cams carried by said shaft, and a tool carrier mounted in and resiliently maintained in a fixed position in said handle, cams carried by said tool carrying member adapted to coöperate with said independent cams to move said carrier longitudinally of said handle in either direction as desired and release the same.

4. A device of the kind described, comprising a handle, and a shaft rotatably mounted in said handle, in combination with a tool carrying member mounted in, and resiliently maintained in a fixed position in said handle, two substantially independent sets of cams with three coöperating cams in a set, each set consisting of a cam fixedly mounted upon said shaft, and a cam fixedly mounted upon said tool carrying member, and a double cam loosely mounted between the two first mentioned cams and adapted to automatically engage with and become an extension of either of said cams, whereby the rotation of said shaft in either direction will periodically move said tool carrying member longitudinally of said handle in either direction and release the same.

5. A device of the kind described, comprising a handle, and a shaft rotatably mounted in said handle, in combination with a tool carrying member slidably mounted in, and resiliently maintained in a fixed position in said handle, and coöperating mechanism operated by the shaft when rotated in either direction for successively moving said mallet member longitudinally in either direction and releasing the same.

6. In a device of the character described, a handle a rotatable shaft mounted in said handle and longitudinally adjustable therein and provided with two oppositely disposed cams, a longitudinally movable sleeve yieldably mounted within said handle and surrounding said shaft, said sleeve being provided on its interior with portions adapted to be engaged by the cams on the shaft, and means for adjusting said shaft to cause either of the cams thereon to coöperate with the corresponding portion in the sleeve.

7. In a device of the character described, a handle, a rotatable shaft mounted therein, a cam carried by said shaft, and a longitudinally movable sleeve yieldably supported within said handle, said sleeve being provided at one end with means for attaching a tool thereto, and on its interior with a portion adapted to be engaged by the cam upon rotation of the shaft.

8. In a device of the character described, a handle a rotatable shaft mounted therein, means for adjusting said shaft longitudinally in said handle, a sleeve mounted in said handle for longitudinal movement, a spring encircling said sleeve, the ends of said spring engaging fixed abutments on the sleeve and handle to normally maintain said sleeve in a fixed position, and means operated by the rotation of the shaft and controlled by the longitudinal position of the shaft for successively moving said sleeve longitudinally of the handle in either direction and releasing the same.

In testimony whereof, I have hereunto signed my name in the presence of two subscribing witnesses.

AUGUST S. LISS.

Witnesses:
BURTON U. HILLS,
CHARLES I. COBB.